United States Patent [19]
Jung

[11] Patent Number: 5,822,181
[45] Date of Patent: Oct. 13, 1998

[54] ELECTRICAL POWER/SIGNAL CONNECTION STRUCTURE FOR SINGLE HOUSING COMPUTER SYSTEM

[75] Inventor: Hae-Soo Jung, Suwon, Rep. of Korea

[73] Assignee: SamSung Electronics Co., Ltd., Suwon, Rep. of Korea

[21] Appl. No.: 707,807

[22] Filed: Aug. 30, 1996

[30] Foreign Application Priority Data

Sep. 1, 1995 [KR] Rep. of Korea ............... 23725/1995

[51] Int. Cl.⁶ ............................. G06F 1/16; H05K 7/14
[52] U.S. Cl. ..................... 361/683; 361/682; 361/727
[58] Field of Search ................... 361/681, 682, 361/683, 686, 724–727; 364/708.1; G06F 1/16

[56] References Cited

U.S. PATENT DOCUMENTS

| | | | |
|---|---|---|---|
| 4,387,951 | 6/1983 | Hall et al. ................................ | 361/682 |
| 4,388,671 | 6/1983 | Hall et al. ................................ | 361/682 |
| 4,734,874 | 3/1988 | Hwang et al. ......................... | 364/708.1 |
| 4,749,364 | 6/1988 | Arney et al. . | |
| 4,788,658 | 11/1988 | Hanebuth . | |
| 5,225,968 | 7/1993 | Ma . | |
| 5,257,163 | 10/1993 | Buist et al. .............................. | 361/682 |
| 5,294,994 | 3/1994 | Robinson et al. ...................... | 348/825 |
| 5,311,397 | 5/1994 | Harshberger et al. . | |
| 5,381,043 | 1/1995 | Kohiyama et al. . | |
| 5,552,957 | 9/1996 | Brown et al. ........................... | 361/683 |
| 5,586,002 | 12/1996 | Notarianni ............................. | 361/681 |
| 5,590,022 | 12/1996 | Harvey .................................... | 361/683 |
| 5,619,397 | 4/1997 | Honda et al. ........................... | 361/686 |
| 5,621,611 | 4/1997 | Kizuya et al. ........................... | 361/681 |

*Primary Examiner*—Lynn D. Feild
*Attorney, Agent, or Firm*—Robert E. Bushnell. Esq.

[57] ABSTRACT

A computer system has a unitary housing structure for containing a display unit, a power supply, and a docking bay receptacle to accommodate an insertion of a main computer body; and an electrical power/signal connection assembly installed to provide electrical power/signal connections between the power supply, the display unit and the main computer body. The electrical power/signal connection assembly includes a connector plug mounted on one side of the unitary housing structure and a corresponding connector socket mounted on the main computer body so that, when the main computer body is inserted into the docking bay receptacle of the unitary housing structure, the corresponding connector socket as mounted on said main computer body is visibly coupled to the connector plug mounted on one side of the unitary housing structure in order to prevent any misalignment that would cause damages to the connector plug.

11 Claims, 3 Drawing Sheets

ELECTRICAL POWER/SIGNAL CONNECTION STRUCTURE FOR SINGLE HOUSING COMPUTER SYSTEM

CROSS-REFERENCE TO RELATED APPLICATION

This application makes reference to, incorporates the same herein, and claims all benefits accruing under 35 U.S.C. §119 from an application for *Electrical Power/Signal Connecting Structure For Single Body Computer Systems* earlier filed in the Korean Industrial Property Office on the 1st of Sep. 1995 and there duly assigned Serial No. 23725/1995.

BACKGROUND OF THE INVENTION

1. Technical Field

The present invention relates to an electrical power/signal connection structure for a computer system in which a main computer body and a monitor are formed integrally.

2. Background Art

Generally, conventional computer architecture comprises a display unit, a processing unit and disk drive in a separate enclosure. This architecture is commonly used in "desk-top" personal computer systems, work stations, terminals and the like. Such a multiple enclosure configuration tends to require an undesirably large foot print. For example, in a "desk-top" computer system the processor enclosure occupies a large amount of valuable desk space. In addition, such multiple enclosure configurations tend to increase production cost and require large numbers of cables extending between the enclosures. This is undesirable because of the cost of such cables and cable connectors, notwithstanding the fact that the cabling and cable connectors are often a source of noise which is difficult to eliminate. Moreover, in conventional multiple enclosure configurations, the display unit and the processing unit each contains its own power supply. Such duplication of a power supply arrangement tends to be cost prohibitive notwithstanding that separate heat dissipation devices such as cooling fans are required.

Recent efforts to integrate those separate processor and peripheral devices such as a display unit into a single, deployable portable housing structure can be found, for example, in U.S. Pat. No. 5,157,585 for *Compact AC-Powerable Portable Computer Having A CPU And Expansion Bay In An Upper Housing Pivotally Attached To A Lower Housing* issued to Myers, and U.S. Pat. No. 5,257,163 for *Computer System Having Monitor With Detachable Module For Providing Diverse Functionality* issued to Buist et al. In Myers '585, for example, both the processing unit including a disk drive system and a display unit are incorporated into a single housing structure. Typically, cable connections for video communications and power supply are made between the processing unit and the display unit inside the housing structure, rather than outside the housing structure as ordinarily required in the conventional computer architecture. However, in such a housing structure which inherently requires a multitude of cables to provide separate electrical power/signal connections between a main body of a processing unit and a display unit, manipulating those cables during the assembly and disassembly of individual hardware components can be very difficult. In Buist '163, on the other hand, a module having a "personality" of a computer system is attached to the rear of a display unit such as a monitor forming an interconnected portable computer system. Once the personality module is attached to the monitor, the monitor is imparted with the "personality" of a personal computer system that can function as a workstation connected to a local area network. While cable connections for video communications and power supply are realized as the processor module is attached to the rear of the display unit, separate signal connection cable and power supply cable are necessarily required to provide electrical power/signal connections between a main body of the processor module and the display unit. The use of separate cables and cable connectors is, however, undesirable because of the production cost. Moreover, such an interconnected arrangement is, however, impractical for personal use.

While there are a number of known cabling connections techniques that are available to minimize the number of cables and cable connectors and simplify the electrical power/signal connections between the processing unit and the display unit usable in the conventional computer architecture disclosed, for example, in U.S. Pat. No. 4,788,658 for *Apparatus For Connecting Computer Components* issued to Hanebuth, U.S. Pat. No. 5,311,397 for *Computer With Modules Readily Replaceable By Unskilled Personnel* issued to Harshberger et al., and U.S. Pat. No. 5,381,043 for *Power Supply Arrangement And Connector* issued to Kohiyama et al., it has been my observation that none is efficiently adapted for a computer system where a processing unit and a display unit are integrated in a single housing structure.

SUMMARY OF THE INVENTION

Accordingly, it is therefore an object of the present invention to provide an improved electrical power/signal connection structure for a single housing computer system.

It is another object to provide an electrical power/signal connection structure for a personal computer capable of efficiently minimize the number of cables and cable connectors required and to simplify the electrical power/signal connections between a processing unit and a display unit as integrated therein.

These and other objects of the present invention can be achieved with a computer system having a unitary housing structure for containing a display unit, a power supply, and a docking bay receptacle to accommodate an insertion of a main computer body; and an electrical power/signal connection assembly installed to provide electrical power/signal connections between the power supply, the display unit and the main computer body. The electrical power/signal connection assembly includes a connector plug mounted on one side of the unitary housing structure and a corresponding connector socket mounted on the main computer body so that, when the main computer body is inserted into the docking bay receptacle of the unitary housing structure, the corresponding connector socket as mounted on said main computer body is visibly coupled to the connector plug mounted on one side of the unitary housing structure so as to prevent the frequent misalignment which would cause damages to the connector plug.

As contemplated by the present invention, the main computer body includes a main board supporting a central processing unit, auxiliary memory devices including a 5.25 inch floppy disk drive, a 3.5 inch floppy disk drive, a hard disk drive, and a plurality of light emitting diodes installed thereon to indicate the operational status of the auxiliary memory devices. The connector plug has a plurality of pins some of which are used to transmit power from the power supply to the main computer body while others are used to transmit information data from the main computer body to the display unit. The connector socket has, on the other hand, a plurality of pin holes for respectively accommodating the plurality of pins of the connector plug when the connector plug is coupled to the connector socket. The connector socket is integrally mounted on a back panel of the main computer body relative to the display unit of the unitary housing structure so that, when the main computer body is inserted into the docking bay receptacle of the unitary housing structure, said connector plug as plugged into said connector socket remains visible to a person assembling the computer system.

The present invention is more specifically described in the following paragraphs by reference to the drawings attached only by way of example.

BRIEF DESCRIPTION OF THE DRAWINGS

A more complete appreciation of the present invention and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
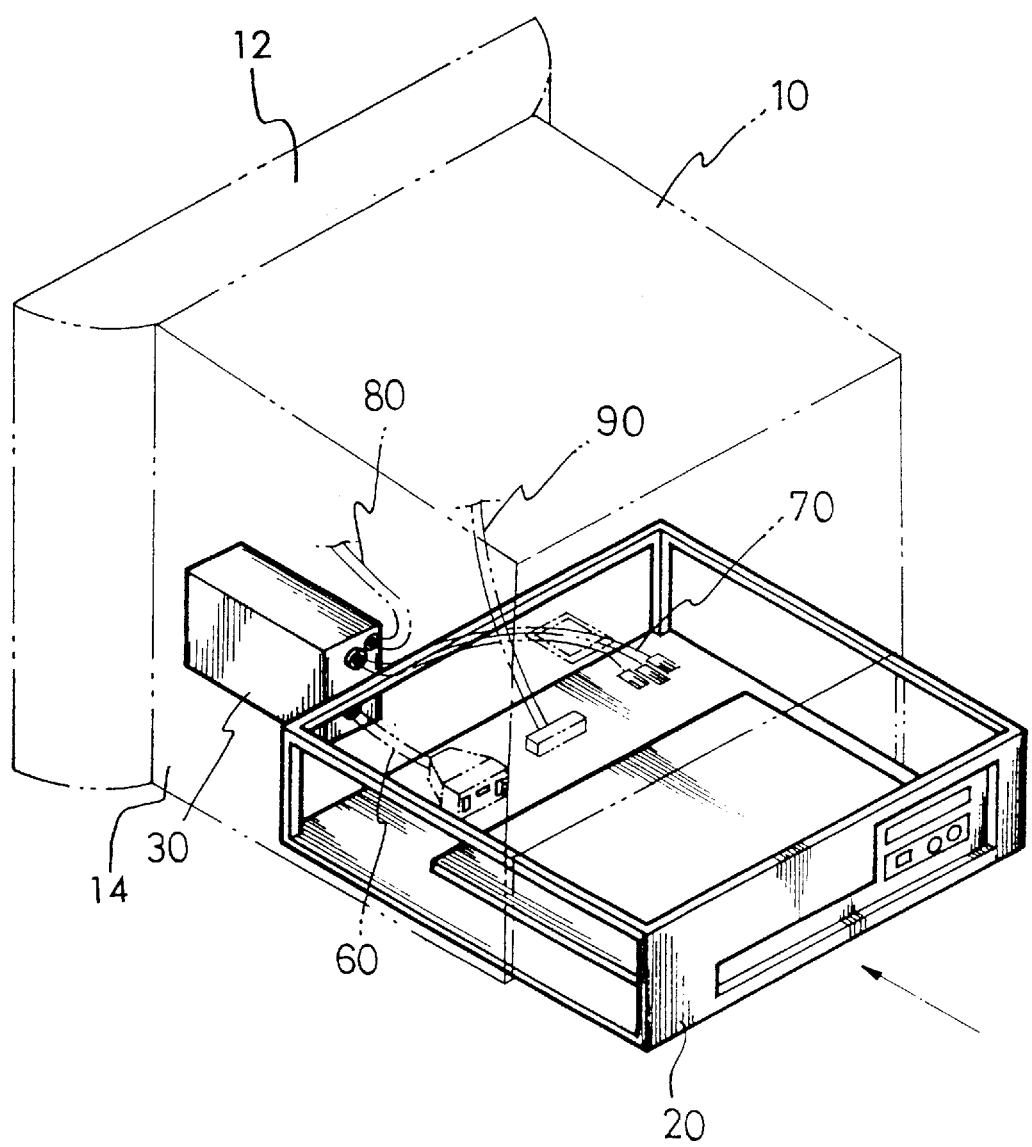
FIG. 1 is a perspective view illustrating a typical electrical power/signal connection structure when hypothetically incorporated into a computer system constructed according to the principles of the present invention.

Referring now to the drawings and particularly to FIG. 1, which illustrates a typical electrical power/signal connection structure when hypothetically incorporated into a computer system constructed according to the principles of the present invention. As shown in FIG. 1, the computer system has a unitary housing structure 10 which includes a display unit 12 such as a cathode-ray tube and a docking bay receptacle 14 integrated therein for accommodating an insertion of a main computer body 20. The unitary housing structure 10 also includes a power supply 30 mounted to one side of the display unit 12 for supplying electrical power to the display unit 12 and to all the individual hardware components of the main computer body 20 such as a main board containing a central processing unit (not shown), auxiliary memory devices such as a 5.25" floppy disk drive, a 3.5" floppy disk drive, a compact disk drive (e.g., a CD-ROM), a tape back up, a hard disk drive (not shown) as well as various light emitting diodes (LED) as installed thereon to indicate the operational status of those auxiliary memory devices. The auxiliary memory devices can be arranged to be accessible to a computer's user from the back of the unitary housing structure 10 as shown in FIG. 1, or alternatively, from the front of the unitary housing structure 10 where the display unit 12 is located.

When a typical electrical power/signal connection structure is hypothetically incorporated in a computer system as shown in FIG. 1, such an electrical power/signal connection structure requires separate monitor electrical power cable and signal connection cable. For example, the supply of electrical power is realized through the power supply 30 as the power supply 30 receives alternating current electrical power from an external source through an input cable 60. The input cable 60 must be plugged into an external power source, in order to transfer power to power supply 30. When the computer system is turned on, part of the electrical power is transferred directly to the display unit 12 by way of a monitor electric power cable 80. The monitor electric power cable 80 transfers power from power supply 30 to display unit 12. The rest of the electrical power is converted into direct current and, through individual wires of a direct-current cable 70, all the individual hardware components of the main computer body 20 such as the main board and the auxiliary memory devices receive electrical power. The transferring of information signal from the main computer body 20 to a video board of the display unit 12 is accomplished through a separate signal connection cable 90. Such an electrical power/signal connection structure, however, requires separate monitor electric power cable and signal connection cable 90 to provide electrical power/signal connections between the main computer body 20 and the display unit 12. Thus, the monitor electric power cable 80 transfers power from power supply 30 to display unit 12 and the signal connection cable 90 transfers information signals between main computer body 20 and display unit 12. The use of separate cables and cable connectors, as described earlier, is undesirable because of the production cost. Moreover, if such electrical power/signal connection structure is incorporated into the computer system constructed according to the principles of the present invention, manipulating those cables having a myriad of intrinsic electrical wires during assembly and disassembly can be extremely difficult.

Figure 2:
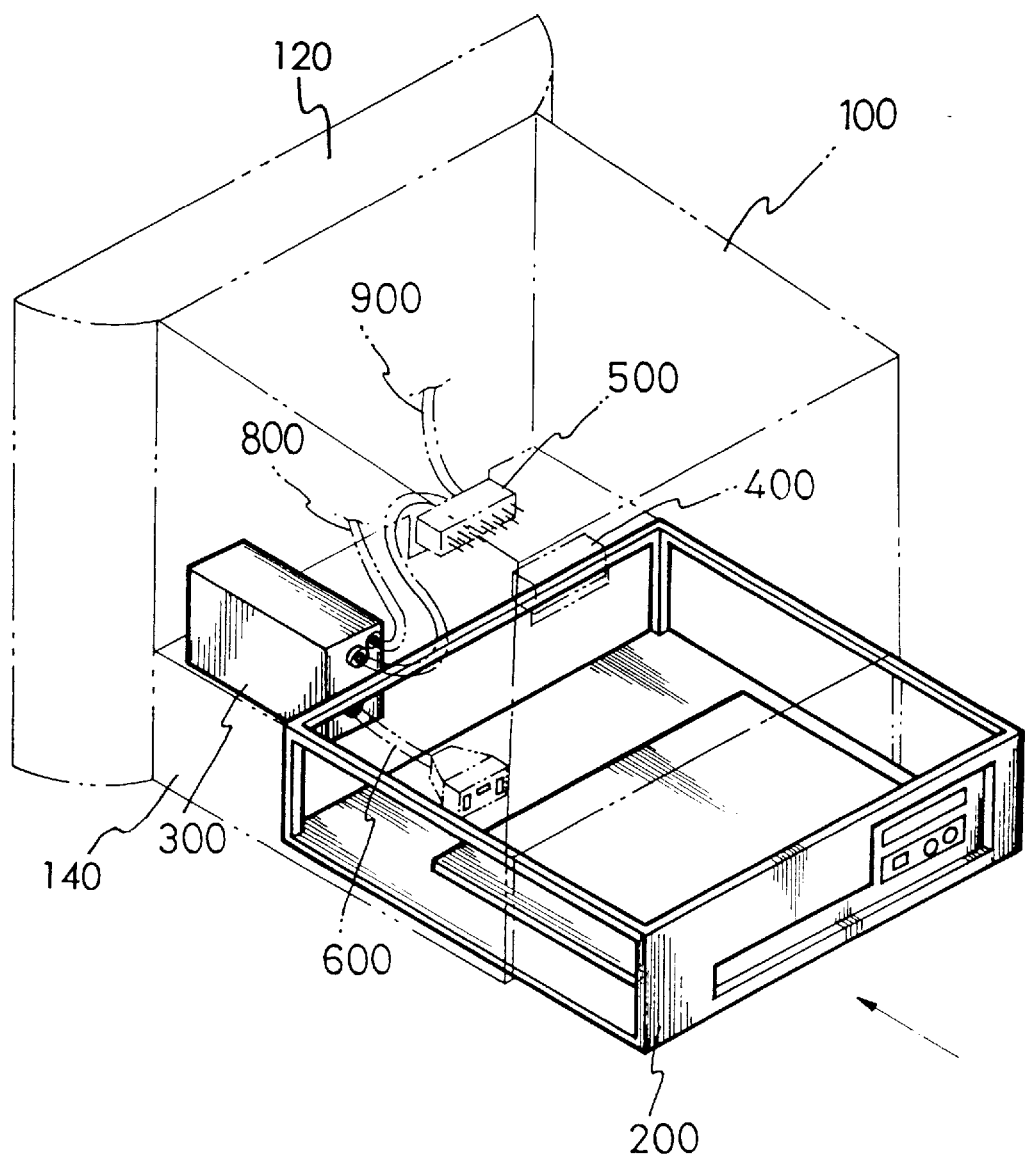
FIG. 2 is a perspective view illustrating a first electrical power/signal connection structure when physically incorporated into a computer system constructed according to the principles of the present invention.

Turning now to FIG. 2 which illustrates a first electrical power/signal connection structure when physically incorporated into a computer system constructed according to the principles of the present invention. The computer system still has a unitary housing structure 100 which includes a display unit 120 and a docking bay receptacle 140 integrated therein to accommodate an insertion of a main computer body 200. This particular electrical power/signal connection structure uses a common connector plug 500 and a corresponding connector socket 400 which seek to minimize the number of cables and the number of connectors need to provide the electrical power/signal connections between the main computer body 200 and the display unit 120. The connector plug 500 includes a plurality of pins some of which are used to transmit power while others are used to transmit information data. The corresponding connector socket 400 has a plurality of pin holes for respectively accommodating the plurality of pins of the connector plug 500 when the connector plug 500 is inserted into the connector socket 400.

As illustrated in FIG. 2, the electrical power/signal connections between the main computer body 200 and the display unit 120 are made through the common connector plug 500 and the corresponding connector socket 400 formed respectively on corresponding sides of the main computer body 200 and the display unit 120. Namely, a signal connection cable 900 of the display unit 120 and a power connection cable 800 from the power supply 300 are connected to the connector plug 500, which, in turn, is connected to the connector socket 400. As a result, the electrical power and signal connections between the display unit 120 and the main computer body 200 are fully realized through the connector plug 500 and the connector socket 400. While such an electrical power/signal connection structure, as I have observed, minimizes the electrical power/signal connections between the main computer body 200 and the display unit 120, the connection between the common connector plug 500 located in the unitary housing structure 100 and the corresponding connector socket 400 located in the back panel of the main computer body 200 may be difficult to implement during the assembly or disassembly of the computer system. This is because both the connector plug 500 and the connector socket 400 are not readily visible to the person inserting the main computer body 200 into the docking bay receptacle 140 of the unitary housing structure 100. Moreover, since the pins of the connector plug 500 are not visible to the person inserting the main computer body 200 into the docking bay receptacle 140 of the unitary housing structure 100, misalignment may occur and forces the pins of the connector plug 500 to become bent or broken off and cause severe damages to the connector plug 500. When alternating current is input into the power supply 300, through an electrical supply cable 600, this electrical power is converted into direct current and is supplied to all the individual hardware components of the main computer body 200, such as a main board containing a central processing unit and auxiliary memory devices. The direct current output from the power supply 300 is passed through a DC electrical-power cable 700 to the dual purpose connector plug 500, as mounted to the opening 160 of the unitary housing structure 100.

Figure 3:
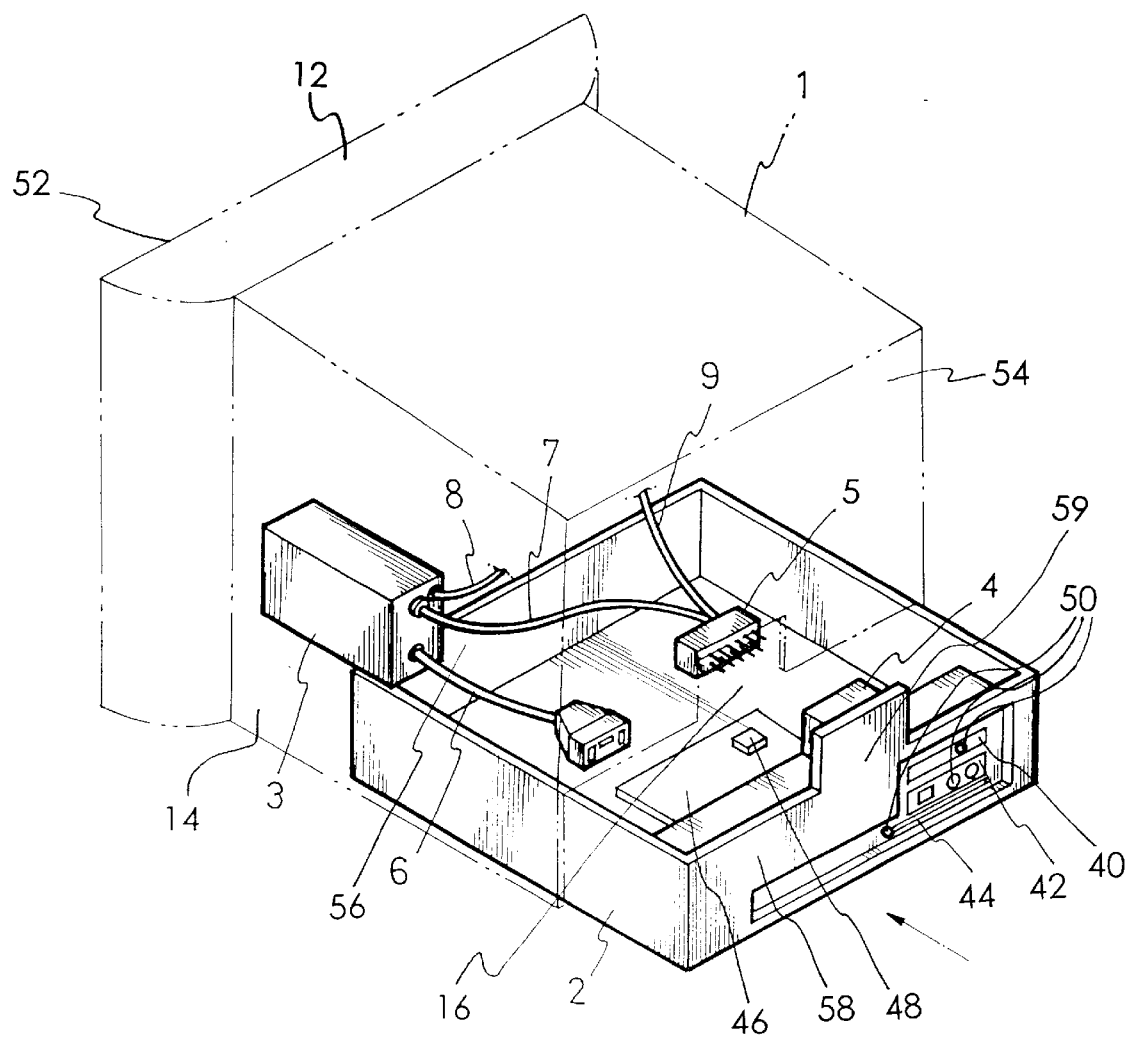
FIG. 3 is a perspective view illustrating an improved electrical power/signal connection structure when physically incorporated into a computer system constructed according to the principles of the present invention.

Refer now to FIG. 3 which illustrates an improved electrical power/signal connection structure for a computer system constructed according to the principles of the present invention. The computer system has the same unitary housing structure 1 which includes a display unit 12 and a docking bay receptacle 14 integrated therein to accommodate an insertion of a main computer body 2. The improved electrical power/signal connection structure is, however, designed to allow the coupling of a dual purpose connector plug 5 and a dual purpose connector socket 4 towards the end of the insertion of the main computer body 2 into the docking bay receptacle 14 of the unitary housing structure 1. Thus, during the insertion, the pins of the connector plug 5 are readily visible to the person assembling the computer system in order to prevent a risk of misalignment which would subsequently cause damages to the connector plug 5. The main computer body 2 has a dual purpose connector socket 4 mounted onto its back panel 58 relative to the unitary housing structure 1, and the unitary housing structure 1 has an opening 16 in its back panel 54 for accommodating placement of a connector plug 5 such that, when the main computer body 2 is inserted into the docking bay receptacle 14 of the unitary housing structure 1, the pins of the connector plug 5 are visible to the person assembling the computer system.

As shown in FIG. 3, the transfer of electrical power begins with a power supply 3 mounted to one side of the display unit 12. An electric supply cable 6 is plugged into an external power source. When alternating current is input into the power supply 3 through the electric supply cable 6, this electrical power is converted into direct current and is supplied to all the individual hardware components of the main computer body 2 such as a main board 46 containing a central processing unit 48, auxiliary memory devices including a 3.5 inch floppy disk drive 40, a hard disk drive 42, and a 5.25 inch floppy disk drive 44, as well as various light emitting diodes 50 installed on the auxiliary memory devices to indicate the operational status of those devices. The auxiliary memory devices can be arranged to be accessible to a computer's user from the back panel 54 of the unitary housing structure 1 as shown in FIG. 3, or alternatively from the front panel 52 of the unitary housing structure 1 where the display 12 is located. The direct current output from the power supply 3 is passed through a DC electrical-power cable 7 to a dual purpose connector plug 5 as mounted to the opening 16 of the unitary housing structure 1. The placement of the connector plug 4 allows the person assembling the computer system to insert the main computer body 2 having a corresponding connector socket 4 mounted thereon, into the docking bay receptacle 14 of the unitary housing structure 1. As the main computer body 2 is inserted all the way into the docking bay receptacle 14, the connector plug 5 is visibly coupled with the corresponding connector socket 4 of the main computer body 2.

When the connector plug 5 is coupled with the corresponding connector socket 4, the signal connection between the main computer body 2 and the display unit 12 is obtained through a signal connection cable 9 connected to the connector plug 5. The electrical power connection between the main computer body 2 and the display unit 12 is obtained through a DC electrical power cable 7 connected to the connector plug 5. The connector socket 4 receives the direct current from the power supply 3 for enabling operation of the main computer body 2. When the main computer body 2 is in operation, the information signal generated therefrom is transmitted to a monitor board via the coupling of the connector plug 5 and the corresponding connector socket 4.

As described, the coupling of the connector plug 5 with the connector socket 4 is accomplished in the back of the computer system where the pins of the connector plug 5 are readily visible to the person assembling the computer system. The locations of the connector plug 5 and connector socket 4 can, however, be changed depending on the direction of insertion of the main computer body 2. Namely, in the present preferred embodiment, as the main computer body 2 is inserted into the back panel 54 of the unitary housing structure 1 starting from the rear part of the unitary housing structure 1, into the docking bay receptacle 14, the connector plug 5 is mounted to the back panel 54 of the unitary housing structure 1, and connector socket 4 is mounted to the back panel 58 of the main computer body 2. The connector plug 5 is mounted to a top panel 59 extending from the back panel 54. However, if the main computer body 2 is inserted into a front panel 52 of the unitary housing structure starting from the front part of the unitary housing structure 1, the connector plug 5 and connector socket 4 can be mounted to a front panel 52 of the unitary housing structure 1 and a front panel 56 of the main computer body 2.

When such an electrical power/signal connection structure is incorporated into a computer system constructed according to the principles of the present invention as shown in FIG. 3, the electrical power and signal connections between the main computer body 2 and the display unit 12 contained in the unitary housing structure 1 are made simultaneously by a single pair of dual purpose connector plug 5 and connector socket 4. As a result, in this type of computer system, the main computer body 2 and the unitary housing structure I can be manufactured separately and can be easily assembled, all of which lead to a significant increase in productivity. In addition, as the unitary housing structure 1 containing the display unit 12 is separable from the main computer body 2, maintenance and/or upgrading of the computer system can be easily obtained.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system, comprising:

a housing structure for housing a display unit, a power supply, and a docking bay receptacle for accommodating an insertion of a computer body, said housing structure having a front panel providing a visual display of information from said display unit and a back panel having mounted thereon a dual purpose connector plug for enabling electrical power and signal connections between said display unit, said power supply and said computer body;

said computer body having a front panel and a back panel, and including thereon said back panel a dual purpose connector socket for electrically communicating with said dual purpose connector plug, when said computer body is inserted into the docking bay receptacle of said housing structure; and said dual purpose connector socket being integrally mounted on the back panel of said computer body so that, when said computer body is inserted into the docking bay receptacle of said housing structure, said dual purpose connector plug as plugged into said dual purpose connector socket remains visible to a person assembling said computer system.

2. The computer system of claim 1, further comprised of said connector plug comprising a plurality of pins for transmitting power from said power supply to said main computer body and for transmitting information data from said main computer body to said display unit.

3. The computer system of claim 2, further comprised of said connector socket comprising a plurality of pin holes for respectively accommodating the plurality of pins of said connector plug when said connector plug is coupled to said connector socket.

4. The computer system of claim 1, further comprised of said power supply including an alternating current cable for receiving electrical power from an external source.

5. The computer system of claim 1, further comprised of said computer body comprising a main board supporting a central processing unit, auxiliary memory devices including a 5.25 inch floppy disk drive, a 3.5 inch floppy disk drive, a hard disk drive, and a plurality of light emitting diodes installed thereon to indicate the operational status of the auxiliary memory devices.

6. The computer system of claim 1, further comprised of said display unit comprising a cathode-ray tube contained in said housing structure for providing a visual display of information on the front panel of said housing structure.

7. A computer system comprising:

a housing structure for housing a display unit, a power supply and a docking bay receptacle for accommodating an insertion of a computer body, said housing structure having a front panel providing a visual display of information from said display unit and a back panel having mounted thereon a dual purpose connector plug for enabling electrical power and signal connections between said display unit, said power supply and said computer body; and said computer body having a front panel and a back panel, and including thereon said back panel a dual purpose connector socket for electrically communicating with said dual purpose connector plug, when said computer body is inserted into the docking bay receptacle of said housing structure, said connector socket being integrally mounted on a top panel extending from the back panel of said computer body so that, when said computer body is inserted into the docking bay receptacle of said housing structure, said connector plug as plugged into said connector socket remains visible to a person assembling said computer system.

8. An electrical power/signal connection assembly for an integrated computer system comprising a main housing structure containing therein a display unit, a power supply and a docking bay receptacle accommodating an insertion of a computer body, said electrical power/signal connection assembly comprising:

a dual purpose connector plug mounted on a back panel of said main housing structure for enabling electrical power and signal connections between said display unit, said power supply and said computer body, said dual purpose connector plug comprising a plurality of pins for transmitting power from said power supply to said main computer body and for transmitting information data from said main computer body to said display unit; and a dual purpose connector socket mounted on a top panel extending from a back panel of said computer body for enabling electrical coupling with said dual purpose connector plug, when said computer body is inserted into the docking bay receptacle of said housing structure, said dual purpose connector socket comprising a plurality of pin holes for respectively accommodating the plurality of pins of said connector plug when said connector plug is visibly coupled to said connector socket as said computer body is inserted into the docking bay receptacle of said housing structure.

9. The electrical power/signal connection assembly of claim 8, further comprised of said power supply including an alternating current cable for receiving electrical power from an external source.

10. The electrical power/signal connection assembly of claim 8, further comprised of said display unit comprising a cathode-ray tube contained in said main housing structure for providing a visual display of information on the front panel of said housing structure.

11. The electrical power/signal connection assembly of claim 8, further comprised of said dual purpose connector socket being integrally mounted on said top panel extending from said back panel of said computer body so that, when said computer body is inserted into the docking bay receptacle of said main housing structure, said dual purpose connector plug as plugged into said dual purpose connector socket remains visible to a person assembling said integrated computer system.

* * * * *